Dec. 5, 1950 J. B. ARMITAGE ET AL 2,532,591
SLOTTING MACHINE
Filed July 11, 1946 5 Sheets-Sheet 1

Fig. 1

Inventors.
Joseph B. Armitage
James N. Flannery
By W. D. O'Connor
Attorney

Fig. 2

Dec. 5, 1950 J. B. ARMITAGE ET AL 2,532,591
SLOTTING MACHINE
Filed July 11, 1946 5 Sheets-Sheet 4

Fig. 5

Inventors
Joseph B. Armitage
James N. Flannery
By W. D. O'Connor
Attorney

Inventors
Joseph B. Armitage
James N. Flannery
By W. D. O'Connor
Attorney

Patented Dec. 5, 1950

2,532,591

UNITED STATES PATENT OFFICE 2,532,591

SLOTTING MACHINE

Joseph B. Armitage, Wauwatosa, and James N. Flannery, West Milwaukee, Wis., assignors to Kearney & Trecker Corporation, West Allis, Wis., a corporation of Wisconsin Application July 11, 1946, Serial No. 682,788

16 Claims. (Cl. 90—44)

This invention relates, generally, to machine tools and more particularly to machines of the reciprocatory ram type such as slotting machines.

A general object of the invention is to provide an improved machine tool of the reciprocating ram type.

Another object of the invention is to provide an improved slotting machine having a rotatable ram driving wobble plate which may be selectively positioned to vary the stroke of the slotting ram.

Another object is to provide a slotting mechanism which may be readily adjusted to effect variations in the stroke of the ram while the mechanism is operating.

Another object is to provide an improved driving mechanism for a reciprocatory ram wherein a ram driving crank is tiltably mounted in such a manner that its plane of rotation may be adjusted angularly relative to the plane of reciprocation of the ram for altering the length of its stroke.

According to this invention, a slotting mechanism is provided which may be mounted on a machine tool to furnish reciprocating movement to a cutting tool. The slotting ram is slidably mounted in a fame or head and is driven by a connecting rod, which, in turn, is pivotally connected to a crank on a tiltable wobble plate. This plate is rotatably driven from a power source through adjustable gearing affording a selection of speeds to vary the rate of ram reciprocation. Selective angular positioning of the wobble plate provides for varying the length of the ram stroke to suit particular cutting operations. The ram carrying head may be pivoted selectively to set the ram at any desired angular cutting position.

The foregoing and other objects of the invention, which will be more fully apparent from the following detail description of exemplifying apparatus, may be achieved by means of the structure shown in and described in connection with the accompanying drawings, in which.

The particular mechanism shown in the drawings as exemplifying structure embodying the invention, is incorporated in a slotting machine arranged as an attachment for mounting on a milling machine, although it is to be understood that the mechanism may be utilized in any machine tool of the reciprocatory ram type and that various features of the invention may be incorporated to advantage in other machines of entirely different construction.

Figure 1:
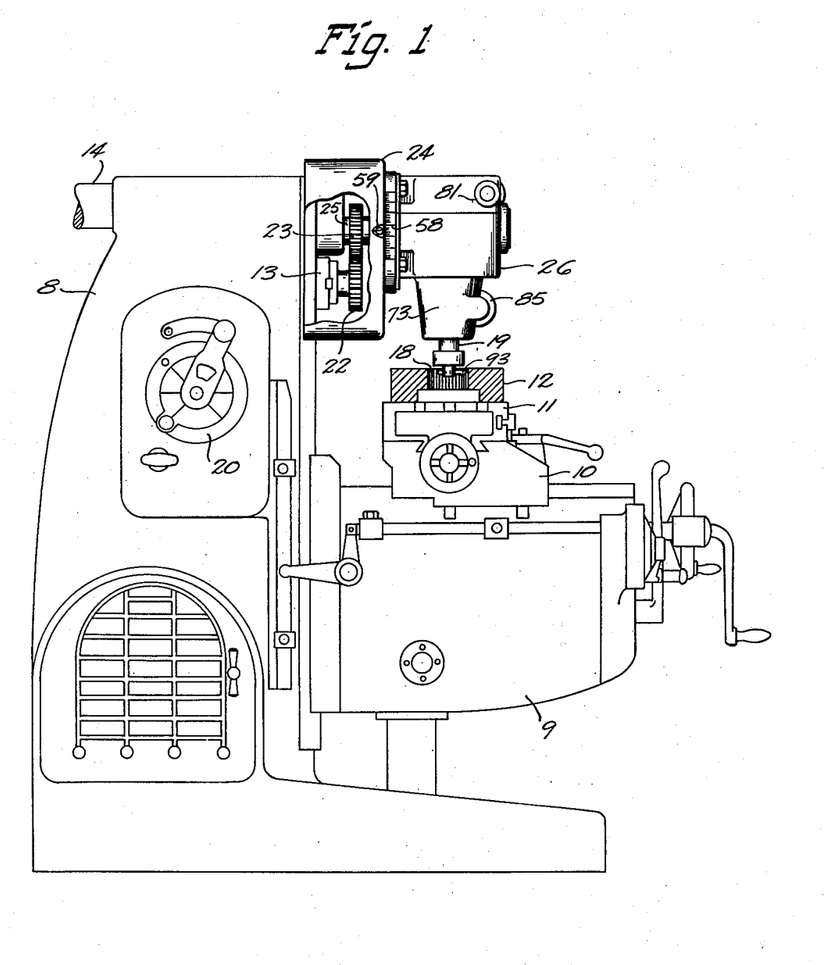
Figure 1 is a general view in side elevation of a machine tool equipped with a slotting attachment embodying the invention, parts having been broken away to show the driving connection with the machine tool spindle.

Referring more specifically to the drawings, and particularly to Fig. 1 thereof, the slotting attachment there illustrated as exemplifying structure incorporating the invention is shown mounted on a standard horizontal milling machine of the knee type. The supporting milling machine comprises essentially an upstanding column 8, upon which a knee 9 is slidably mounted for vertical movement, the knee carrying superimposed thereon a saddle 10 and a work supporting table 11 slidably mounted for horizontal movement in transverse planes. The three work supporting elements may be manually or power actuated through appropriate driving mechanisms to provide movement of a workpiece 12 mounted on the table 11 in cooperating relationship with a cutter driving spindle 13 rotatably mounted in the column 8 in a manner well known to the machine tool art. A milling machine of this type is more fully described in U. S. Patent No. 2,344,529, issued to Joseph B. Armitage and dated March 21, 1944. An overarm structure 14 retractably mounted in the top of the milling machine column 8 serves to support any of various cutter carrying arbors or attachments that may be mounted upon the machine.

Figure 2:
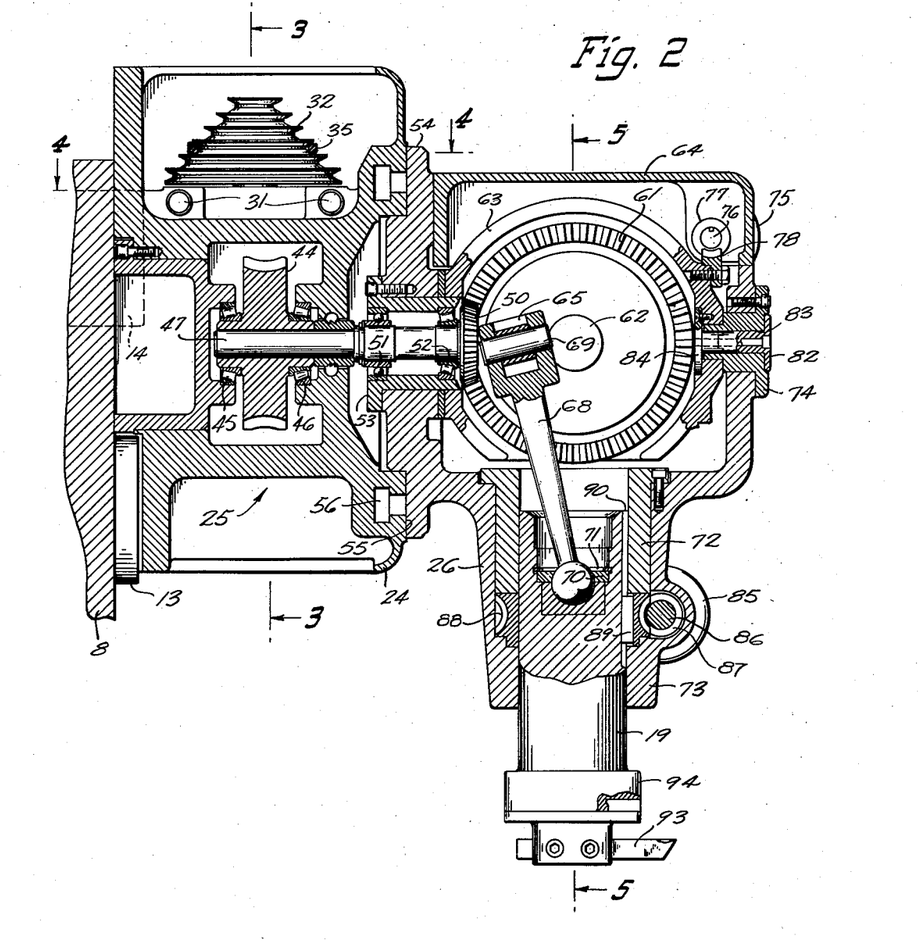
Fig. 2 is an enlarged view in longitudinal vertical section through a modified form of the slotting attachment and showing the driving train to the ram.
Figure 3:
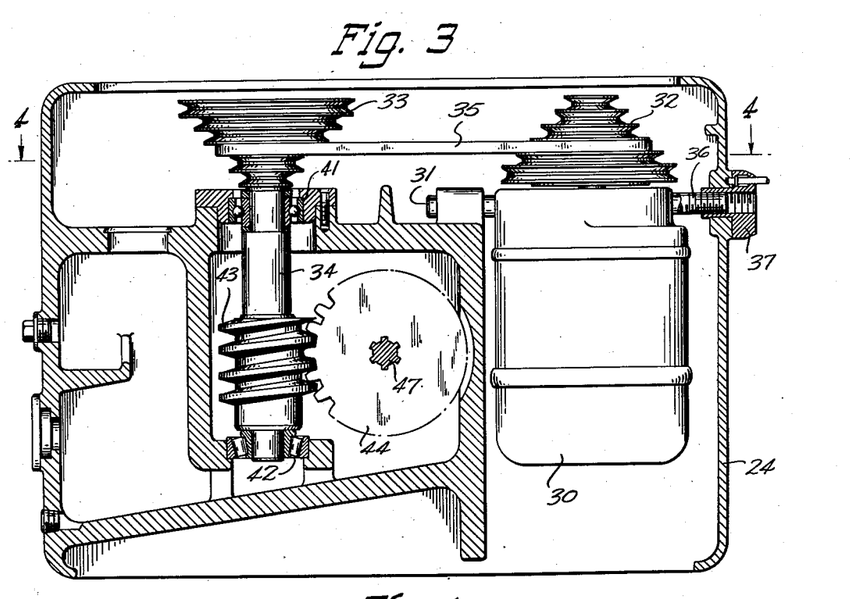
Fig. 3 is a view in vertical transverse section, taken on the plane of the lines 3—3 in Fig. 2, and showing an independent driving motor and speed change mechanism for the modified attachment.
Figure 4:
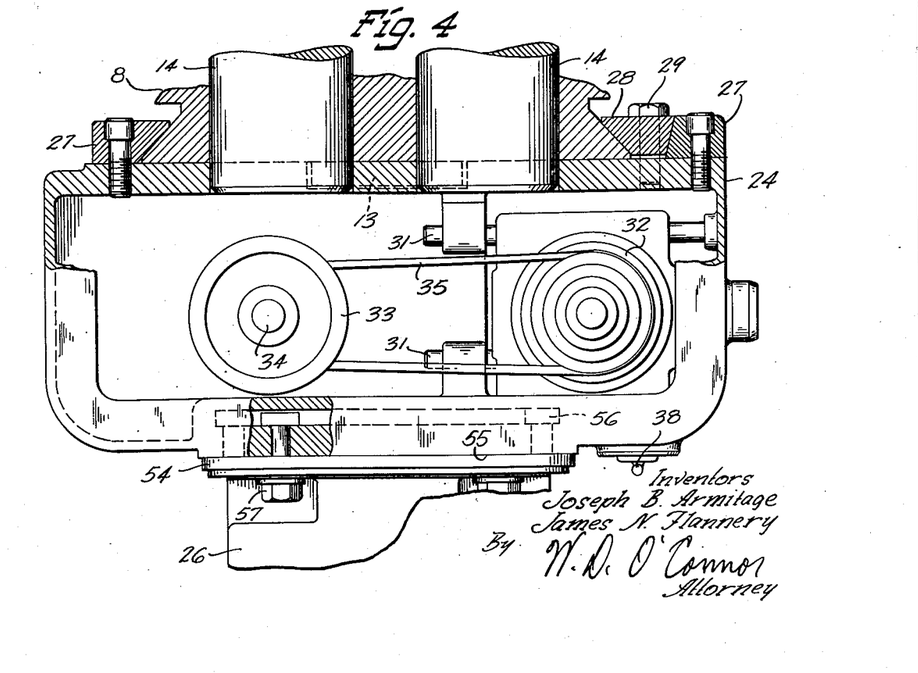
Fig. 4 is a fragmentary view in horizontal section of the speed change mechanism and clamping means, taken substantially on the plane of the lines 4—4 in Figs. 2 and 3.

In the particular arrangement shown in Fig. 1, the attachment illustrated is a slotting attachment embodying the present invention that is mounted on the face of the machine tool column 8 and is supported upon the extending ends of the overarms 14. With this attachment, the machine tool is adapted to perform specialized types of machining operations, for example a slotting operation in which a plurality of formed slots or grooves 18 may be cut in the workpiece 12 through the reciprocatory motion of a slotting ram or carriage 19. The slotting attachment may be directly power driven from the machine tool spindle 13, as shown in Fig. 1 or the attachment may be provided with an independent power source as shown in Figs. 2, 3 and 4. When driven from the machine tool spindle, the rate of reciprocation of the slotting ram 19 is controlled by selectively manipulating a speed selecting and indicating mechanism 20 which operates speed changing apparatus contained in the column 8 and disposed to drive the tool spindle 13 at any one of a plurality of speeds.

As shown in the drawing, the arrangement for driving the slotting attachment directly from the machine tool spindle 13, comprises a gear 22, that is fitted to the nose of the spindle 13, and has meshing engagement with a complementary gear 23 that is rotatably mounted in the upper part of a housing 24 which constitutes the frame of the attachment. The gear 23 is fixed on a driving shaft 25, that projects forwardly into a ram carrying head 26, in which the slotting ram 19 is slidably mounted for reciprocatory slotting action through operation of mechanism driven by the shaft 25. To provide for adjusting the angle at which the ram 19 is presented to the workpiece 12, the ram carrying head 26 is pivotally mounted on the frame 24, concentrically with the shaft 25 for swiveling movement in a vertical plane, the workpiece being appropriately positioned through adjustment of the work supporting members.

The slotting attachment is supported upon the upper part of the milling machine column 8, through engagement of sockets in the frame 24, with the extending ends of the overarms 14. Furthermore, the frame is clamped to the face of the column, as best shown in Fig. 4, by a pair of clamping plates 27 and a cooperating gib 28, disposed to engage the vertical dovetailed grooves at the sides of the column face, the required clamping pressure being established by tightening clamping nuts 29, which operate to force the gib 28 into wedging engagement with the inclined face of the dovetailed groove.

Figure 5:
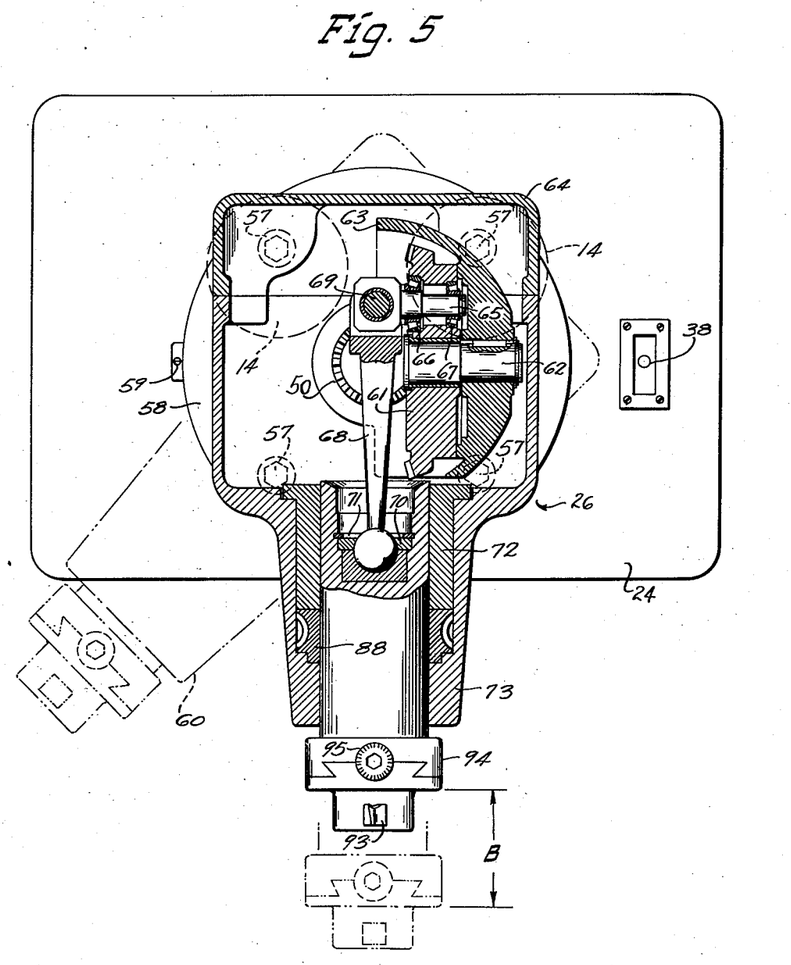
Fig. 5 is a view in vertical section, taken on the plane of line 5—5 in Fig. 2, showing the ram driving mechanism in detail.

In a modified arrangement of the attachment, provision is made for a separate power source and driving mechanism, thus making the attachment a compact, independent unit. As shown in Figs. 3 and 4, the slotting ram 19 of the attachment is power driven from a motor 30 adjustably disposed in the right side of the frame 24. The motor 30 is slidably retained in a driving position by means of a pair of fixed rods 31 extending horizontally through the motor frame and anchored in the attachment frame 24. The motor shaft is keyed to a step pulley 32 horizontally disposed in the top of the frame 24. A second complementary step pulley 33 is keyed on the upper end of a vertical shaft 34 and is driven from the pulley 32 by means of a connecting V-belt 35. The belt 35 may be selectively positioned in any one of a plurality of grooves on the pulleys 32 and 33 in order to provide a fixed step speed range for the attachment. The tension of the belt 35 is adjusted by positioning the motor 30 on the pair of rods 31 through operation of a stub screw shaft 36, which is fixedly carried in the motor frame. A handwheel and dial 37 is rotatably mounted in the frame 24 in cooperating axial alignment with the screw shaft 36. The screw threads of the shaft 36 engage complementary threads within an internal bore in the dial 37 and effect movement of the motor whenever the hand wheel is rotated. The motor 30 is controlled, in the usual manner, by a switch 38 mounted on the front of the frame 24, as shown in Figs. 4 and 5.

The pulley driven shaft 34 is rotatably journalled in the frame 24 by a pair of bearings 41 and 42. A worm 43 is splined to or formed on the lower end of the shaft 34 and meshes with a worm wheel 44, which is rotatably journalled in a pair of bearings 45 and 46, as shown in Fig. 2. The worm wheel 44 is internally splined to receive the inner end of a horizontal driving shaft 47, the forward or outer end of which extends into the ram head 26 and has a bevel gear or pinion 50 integrally formed thereon. The shaft 47 is rotatably mounted in a radial bearing 51 and a thrust bearing 52, both of which are carried in a sleeve member 53, that is bolted within a rearwardly extending face 54 of the ram head 26. The face 54 on the head engages with a correspondingly finished surface 55 on the front side of the frame 24. The frame surface 55 is provided with a circular T-slot 56, which is adapted to receive four T-bolts 57, as shown in Figs. 4 and 5, that permit selective angular adjustment of the ram head 26 in accordance with a scale of graduations 58 on the periphery of the ram head 26, when read against a zero mark 59 on the frame member 24, thereby providing means for angularly setting the slotting ram 19 for effecting slotting operations at any desired angle. For example, as indicated by dotted lines 60 in Fig. 5, the ram head 26 may be set at 45° from the vertical to permit a slotting operation on a similarly angled surface of a workpiece. Thus, the attachment may be readily adapted to perform slotting operations on a workpiece at any desired inclination.

In accordance with an important feature of this invention, the length of the cutting stroke of the slotting ram 19 may be adjusted readily to adapt it to the work at hand and may be changed as desired while the machine is in operation. This is accomplished through actuating the ram by means of a tiltably mounted crank formed on a swash plate or wobble gear 61, provided with bevel gear teeth complementary to and meshing with the teeth of the bevel gear 50 on the driving shaft 47. As shown in Figs. 2 and 5, the ram driving wobble plate 61 is rotatably mounted on a stub shaft 62, that is fixed in a gear carrier or cradle 63, which is pivotally mounted in the ram head 26 for angular adjustment about an axis concentric with the axis of rotation of the bevel gear 50. By this arrangement, the cradle 63 may be pivotally adjusted within the ram head 26, and the head itself pivotally adjusted relative to the attachment frame 24 about the same pivot axis without interfering with proper meshing of the teeth of the gear 50 with the teeth on the driving plate 61. A removable cover 64, constituting the top of the ram head 26, may be opened to provide ready access to the driving mechanism within the head.

Power is transmitted from the wobble plate 61, to the ram 19, by articulated linkage which operates at any inclination of the plate 61 to impart reciprocated movement to the ram, the length of stroke of the ram being proportional to the degree of inclination of the plate 61. The connecting linkage comprises a crankpin 65, that is journalled in the wobble plate 61 on thrust bearings 66 and 67 at a position eccentric with respect to the center of rotation of the plate, as shown in Figs. 2 and 5. The outer end of the crankpin 65 is connected to the upper end of a connecting rod 68 by means of a transversely positioned pivot pin 69, the double swivel action afforded by the pin 65 and the pin 69 providing a universal connection between the rod 68 and the crank plate 61 regardless of the angular position of the plate. The lower end of the connecting rod 68 is formed with a swivel ball joint, held within a complementary socket in the upper end of the slotting ram 19 by means of a split retaining socket member 70, that is held in the ram by a snap ring 71, the arrangement being such that the connecting rod has free universal movement relative to the ram. Thus, the rotation of the wobble plate 61 causes the crankpin 65 to be rotated on a fixed diameter of the plate and to impart a gyratory movement to the upper end of the connecting rod 68 and, consequently, effect a reciprocatory movement of the slotting ram 19 connected therewith. The slotting ram 19 is slidably mounted for both rotary and reciprocatory movements in a cylindrical sleeve bearing 72 fixed in a downwardly extending nose 73 of the ram head 26.

As previously explained, the rate of reciprocation of the ram 19 may be varied for a particular slotting operation by selectively positioning belt 35 in the various grooves on the pulleys 32 and 33. Likewise, as previously mentioned, adjustment of the length of the ram stroke is accomplished by varying the angular position of the carrier or cradle 63 within the ram head. To this end the carrier 63 is trunnioned in the head 26 upon a pair of pivot bearings as shown in Fig. 2 constituted by the sleeve or bearing 53 which is fixedly carried by the inner end of the ram head frame, and a coaxial bearing 74 fixedly carried in the outer end of the ram head. Since the axis of bearing 74 is in alignment with that of bearing sleeve 53, the gear carrier 63 may be selectively positioned angularly about them on an axis which is concentric with the axis of the shaft 47 and the gear 50 that are carried in the sleeve 53. Any adjustment of the carrier about this axis will tilt the wobble plate 61 to vary the orbit of operation of the upper end of the connecting rod 68 and, consequently, will vary the length of the slotting ram stroke.

With the wobble plate 61 disposed in the vertical position, as shown in Fig. 5, the connecting rod 68 will operate on the maximum effective orbit and will transmit the maximum reciprocating movement to the slotting ram 19. However, when the gear carrier 63 is tilted to any intermediate position between a vertical and a horizontal plane, the length of the ram stroke will be proportionately shortened, since only the vertical component of the orbital motion is effective in actuating the ram. With the wobble plate 61 in a horizontal position, the circular movement imparted to the connecting rod 68 is in a horizontal plane and, consequently, since there is no vertical component no vertical reciprocatory movement will be imparted to the slotting ram 19.

Figures 6, 7:
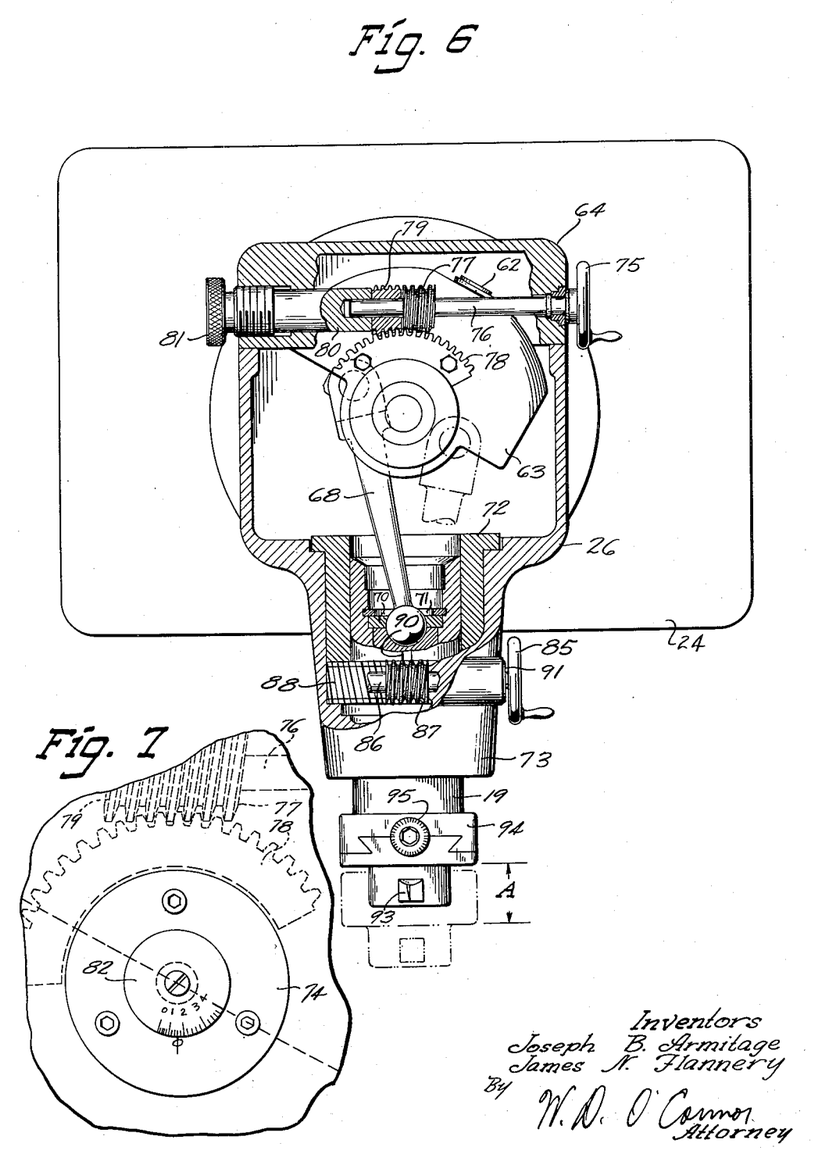
Fig. 6 is a view similar to Fig. 5 but showing the ram driving mechanism adjustably positioned to provide a shorter operating stroke.
Fig. 7 is an enlarged fragmentary elevational view of the gear carrier dial mechanism on the front of the ram head.

As shown in Fig. 6, the gear carrier 63 is adjustably positioned at approximately 30° from the horizontal plane and, consequently, while the circumferential distance of travel of the crankpin 65 will remain the same, the effective vertical movement of the connecting rod 68 will be proportionately less than at the vertical position thereby shortening the stroke of the ram 19. The dotted lines indicate the limits of connecting rod and ram movements with the carrier in the adjusted position shown.

Selective adjustment of the gear carrier 63 may be effected by manipulating a handwheel 75 on the right side of the ram head 26 at any time, regardless of whether or not the ram is operating. The handwheel 75 is pinned on the extending end of a shaft 76, which carries a worm 77 fixed on its inner end and that is journalled in the cover 64 in such position that the worm meshes with a gear segment 78 bolted on the front of the gear carrier or cradle 63. The axial center of the gear segment 78 coincides with the axis of rotation of the carrier 63 and, consequently, rotation of the handwheel 75 serves to effect rotation or tilting of the carrier.

In order to lock the carrier securely while the attachment is performing a slotting operation, a second worm 79 is rotatably mounted on the shaft 76 in abutting relationship with the worm 77. The worm 79 meshes with the worm wheel 78, and, when free to rotate, is rotatably driven from the worm wheel. However, when the worm 79 is forceably engaged by the inner end of a locking rod 80 threadably retained in the ram head 26, the worm 79 is moved axially until the threads thereon clamp those on the wheel 78 in a manner to lock the carrier 63 in an adjusted position. With this arrangement, any backlash which may develop between the worm 77 and worm wheel 78 is removed during clamping so that each stroke of the ram 19 will be identical in length. Thus no variation in stroke can occur. A knob 81 integrally formed on the end of rod 80 may be readily manipulated by the machine operator to effect clamping. A pin (not shown) anchored in the rod 80 limits the outward or releasing movement of the rod and consequently, minimizes the amount of backlash in the worm mechanism when unclamped.

The adjusted angular position of the carrier 63 is indicated by a dial 82 mounted on the front of the ram head 26, as shown in Figs. 2 and 7. Appropriate indicia indicating the length of ram stroke are marked on the face of the dial 82 and may be readily read against a zero mark on the non-rotatable sleeve bearing 74. The dial 82 extends through a bored opening 83 in the bearing 74 and is keyed to a plug member 84 having an extending flange which is secured to the inside of the gear carrier 63. Thus, any rotative movement of the carrier will effect an identical movement of the dial 82 thereby permitting the machine operator to readily determine the length of ram stroke as read from the dial indicia and to effect the desired adjustment regardless of whether or not the apparatus is in operation. For example, with the carrier 63 in the position shown in Fig. 6, the dial 82 will be positioned to indicate that the selected range of the ram stroke is approximately 1.50 inches. Thus, the range of ram reciprocation, as indicated by the distance A in Fig. 6, is considerably shorter than the maximum range of travel, as indicated by distance B in Fig. 5.

For certain types of slotting operations, it may be necessary to slot a series of grooves on the peripheral edge of a workpiece or upon the inner circumferential surface of a workpiece. As shown in Fig. 1, an example of this type of operation might consist of cutting serrations on the inner diameter of a bore in the workpiece 12. Past machining practice has required that the workpiece, in this instance, be mounted on a rotatable table and indexed after each serrating stroke in order to position it under the cutter for the next succeeding cutting stroke. With the attachment herein disclosed, the workpiece can be mounted directly on the machine tool table without using a rotatable table, since provision has been made to effect the rotation of the cutting ram within the ram head. As previously explained, the ram is slidably and rotatably retained in a sleeve bearing 72 fixedly mounted in the nose 73 of the ram head 26. The ram 19 can be adjusted angularly within the sleeve bearing by manipulating a small handwheel 85 (see Figs. 2 and 6) operatively mounted on the side of the nose 73. The handwheel 85 is keyed to the extending end of a shaft 86. A worm 87 integrally formed on the other end of the shaft 86 meshes with a worm wheel 88 rotatably disposed within the ram nose 73 directly below the sleeve bearing 72. The inner diameter of the worm wheel 88 is slightly larger than the inner diameter of the sleeve bearing 72 to permit reciprocal movement of the ram 19 therein. As shown in Fig. 2, a key 89, fixedly carried by the worm wheel 88 extends into and has a sliding fit with a keyway 90 cut into the peripheral surface of the ram 19. Thus, the ram is constantly free for reciprocating movement but is retained against rotative movement by the key 89. Since the worm 87 and wormwheel 88 are of the locking type, the precise adjustment of the ram may be effected, even while the ram is reciprocating, without the possibility that vibration in the attachment may change the angular ram setting. A dial 91, carried on the shaft 86, serves to indicate the angle of the ram setting in a manner familiar to the machine tool art.

In order to facilitate the precise adjustment of a slotting tool 93, the end of the ram 19 is provided with an adjustable cross slide or tool head 94. With this tool head, it is possible to radially adjust the slotting tool 93 and thereby aid the operator in setting the tool to cut a desired depth of slot in a workpiece or to operate upon a curved surface of predetermined radius. A dial 95 on the side of the tool head 94 readily indicates the amount of radial adjustment.

Although the particular mechanism shown in the drawings and described in the specifications has been explained in detail to adequately describe the invention, the structure set forth is to be taken as exemplary only and it is to be understood that various other embodiments of the invention may be constructed without departing from the spirit and scope of the invention, as defined in the subjoined claims.

The principles of the invention having now been fully explained in connection with the foregoing description of embodying structure, we hereby claim as our invention:

1. In a slotting attachment for a milling machine, a frame adapted to be attached to a milling machine column, a ram carrying head pivotally mounted on said frame for angular adjustment about a pivot axis, a ram slidably mounted in said head for reciprocatory movement along an axis perpendicular to said pivot axis, a cradle pivotally mounted in said head upon said pivot axis for angular adjustment relative to said head, a power driven shaft journalled in said frame concentric with said pivot axis and projecting into said head and cradle, a bevel pinion mounted on said shaft within said cradle, a bevel gear wheel rotatably mounted in said cradle upon an axis disposed at right angles to said pivot axis and in position to mesh with said bevel pinion regardless of the angular positions of said head or said cradle, a connecting rod jointedly connected at one end to said bevel gear wheel eccentrically of its center of rotation and at its other end to said ram in manner to impart reciprocatory movement to said ram upon rotary movement of said gear wheel, and means to adjust said cradle angularly relative to said head for selecting the degree of inclination of said gear wheel to regulate the length of the stroke of movement of said ram.

2. In a machine tool of the reciprocatory ram type, a frame, a cradle mounted for pivotal movement in said frame, a crank plate rotatably mounted in said cradle with its axis of rotation transverse to the axis of pivotal movement of said cradle, a source of power operatively connected to rotate said crank plate regardless of the angular position of said cradle in its pivotal movement, a tool carrying ram slidably mounted in said frame for reciprocatory movement along an axis perpendicular to the axis of pivotal movement of said cradle and in the plane of angular adjustment of the axis of rotation of said crank plate, and a connecting rod interconnecting said crank plate and said ram in manner to impart reciprocatory movement to said ram upon rotation of said crank plate to the extent determined by the angular position of said crank plate carrying cradle.

3. In a machine tool, a frame, a source of power carried by said frame, a bevel pinion rotatably mounted in said frame and connected to be driven by said source of power, a wobble plate provided with bevel gear teeth meshing with and driven by said pinion, means supporting said wobble plate in said frame for rotation about its axis and for tilting movement about the axis of said pinion, a tool carrying ram slidably mounted in said frame for reciprocatory movement transverse to the axis of tilting movement of said wobble plate, and a connecting rod operatively interconnecting said wobble plate and said ram, the arrangement being such that said ram is caused to reciprocate through action of said connecting rod upon rotation of said wobble plate by said pinion the extent of the reciprocatory movement of said ram being dependent upon the position to which said wobble plate is tilted.

4. In a machine tool of the reciprocatory ram type, a frame, a tool carrying ram slidably mounted for reciprocatory movement in said frame, a wobble plate rotatably and tiltably mounted in said frame, a connecting rod operatively interconnecting said wobble plate and said ram in manner to impart reciprocatory movement to said ram when said plate rotates, and means to tilt said wobble plate to adjust the length of the stroke of said ram.

5. In a machine tool, a tool carrying ram arranged for reciprocatory movement, a wobble plate, a connecting rod interconnecting said wobble plate and said ram in manner to effect reciprocation of said ram upon rotation of said plate, a bevel gear wheel fixed to said wobble plate for driving it, a bevel pinion meshing with said bevel gear wheel, means to drive said bevel pinion for actuating said ram, and means to tilt said wobble plate about the axis of rotation of said pinion for regulating the extent of the reciprocatory movement of said ram.

6. In a slotting attachment for a milling machine of the knee and column type, a frame arranged to be secured to the column of the milling machine, a cutter carrying ram slidably mounted in said frame for vertical reciprocatory movement toward and from the work supporting knee, a connecting rod pivotally attached to said ram and extending upwardly therefrom, a driving crank pivotally attached to said connecting rod, power operated means connected to gyrate said crank for actuating said connecting rod to reciprocate said ram, and means to adjust the inclination of the plane of gyration of said crank to the vertical for regulating the length of stroke of said cutter carrying ram.

7. In a machine tool of the reciprocatory ram type, a frame, a ram slidably mounted for longitudinal movement in said frame, a crank plate rotatably and pivotally mounted in said frame with its axis of rotation and its axis of pivotal movement intersecting on the axis of longitudinal movement of said ram, said pivotal movement axis being transverse to said axis of rotation and to said ram axis, a connecting rod attached by universal joints to said ram and to said crank plate whereby rotation of said plate operates said connecting rod to reciprocate said ram to the extent determined by the angular position of said crank plate, and means to adjust the position of said crank plate angularly about its pivot axis for regulating the length of the ram stroke.

8. A slotting mechanism comprising a frame, a power source, a transmission driven by said power source and contained in said frame, a gear driven from said transmission, a ram head pivoted on said frame for swivel movement about an axis coincident with the axis of rotation of said gear, a gear carrier journalled in said ram head for rotation on said axis, adjusting mechanism to effect selective positioning of said gear carrier, a second gear rotatably mounted on said gear carrier in a manner to continuously mesh with said first gear, a slotting ram reciprocably mounted in said ram head, and a universally jointed connecting rod joining said second gear and said ram, whereby the range of reciprocation of said ram is selectively dependent upon the position of said second gear and gear carrier in said ram head without regard to the adjusted position of said ram head on said frame.

9. In a universal slotting attachment for a machine tool, a frame, a power source, a variable speed transmission driven by said power source, a ram head swivelably carried on said frame, clamping means to clamp said head at a selected angular position on said frame, an adjustable gear carrier trunnioned in said ram head, a gear rotatably mounted on said carrier and disposed to be driven from said transmission regardless of the position of said head, a ram slidably mounted for reciprocation in said ram head, linkage mechanism connecting said gear and said ram, a gear segment fixedly attached to said carrier, an adjusting mechanism journalled in said ram head and disposed to operate on said gear segment and adjustably position said carrier to vary the range of reciprocation of said ram, and a clamping mechanism operative upon said adjusting mechanism on said gear segment to limit backlash between said adjusting mechanism and said gear segment and to fixedly clamp said carrier in an adjusted position whereby each ram stroke will be of a selected length.

10. A slotting mechanism comprising a frame, a ram head swivelably mounted on said frame, a ram slidably carried in said ram head, a power source, a variable speed transmission operably contained in said frame and driven from said power source, a gear carrier adjustably trunnioned in said ram head, a gear rotatably carried by said carrier and operatively connected with said transmission, linkage mechanism connecting said gear and said ram, and a carrier adjusting mechanism disposed to selectively position said carrier and gear and effectively vary the range of ram movement, whereby said ram may be reciprocally driven in said ram head by said transmission at a selected rate while said carrier adjusting mechanism is manipulated to selectively change the range of ram reciprocation.

11. A slotting mechanism comprising a frame, a power source, a variable speed transmission mechanism mounted in said frame and driven from said power source, a driven pinion extending from said frame and connected to be driven by said transmission mechanism, a ram head swivelably mounted on said frame for rotation about an axis coincident with the axis of rotation of said driven pinion, a gear carrier mounted for angular positioning about the same axis in said ram head, adjusting means in said head to provide selective positioning of said carrier, a gear rotatably mounted on said gear carrier and disposed to mesh with said pinion regardless of the angular positioning of said carrier about said axis, a crankpin mounted on said gear, a tool retaining ram slidably mounted in said head, and a connecting rod swivelably jointed with said crankpin and said ram, whereby said ram is reciprocated in said head at a rate dependent on the output speed of said transmission and with the range of reciprocation dependent upon the adjusted angular position of said gear carrier within said ram head.

12. A slotting attachment for a milling machine, comprising a frame adapted to be fixed on a milling machine in cooperative relationship with the work supporting table thereof, a cutter carrying ram slidably mounted in said frame for reciprocatory movement relative to the milling machine table, a crank mounted for rotation about an axis disposed at an angle to the axis of reciprocation of said ram, means supporting said crank in said frame for tilting movement about an axis transverse to its axis of rotation, means operatively connected to drive said crank regardless of said tilting movement, and a connecting rod operatively interconnecting said crank and said ram, whereby said ram may be reciprocated through a stroke of length determined by the angular relationship between the axis of rotation of said crank and the axis of reciprocation of said ram.

13. In a machine tool of the reciprocatory ram type, a frame, a ram slidably mounted in said frame for movement along its longitudinal axis, a cradle pivotally mounted in said frame for angular adjustment about an axis transverse to the longitudinal axis of said ram, a crank rotatably mounted in said cradle with its axis of rotation transverse to the pivotal axis of said cradle, a universal joint mounted on said crank eccentrically of its center of rotation, another universal joint mounted on said ram, a connecting rod interconnecting said universal joints for imparting reciprocatory movement to said ram upon rotation of said crank, a bevel gear secured to said crank for driving it, a bevel pinion rotatably mounted concentric with the axis of pivotal movement of said cradle and meshing with said bevel gear to drive it regardless of the angular position of said cradle, and means to adjust the angular position of said cradle and crank while said crank is rotating to regulate the length of the stroke of movement of said ram.

14. In a machine tool, a frame, a reciprocatory member slidably mounted on said frame, a crank rotatably and tiltably mounted on said frame, a connecting rod articulatively connected to said crank and to said reciprocatory members for operatively interconnecting them, and means to tilt said crank for adjusting its plane of rotation relative to said frame to alter the length of the stroke of reciprocation of said member.

15. In a machine tool of the reciprocatory ram type, a frame, a ram slidably mounted in said frame for reciprocatory movement along a predetermined path, a crank mounted for rotation to actuate said ram, adjustable supporting means carrying said crank in said frame in manner to provide for tilting movement of said crank to change the angle between its plane of rotation and the path of reciprocation of said ram, power actuated means operatively connected to effect rotation of said crank regardless of the angular position of its plane of rotation, and linkage operatively interconnecting said crank and said ram, the arrangement being such that upon rotation of said crank said ram is caused to reciprocate through a stroke of length depending upon the angular relationship between said path of reciprocation and said plane of rotation.

16. In a machine tool having a frame and a carriage slidably mounted on said frame for reciprocatory movement, a bevel pinion rotatably mounted on said frame, a complementary bevel gear rotatably mounted to mesh with said pinion and tiltably supported on said frame for angular adjustment of its plane of rotation about an axis coincident with the axis of rotation of said pinion, said gear remaining in mesh with said pinion regardless of the angular position of its plane of rotation, a connecting rod articulatively connected to said bevel gear eccentrically of its axis of rotation and to said slidably mounted carriage in manner constituting an operative driving connection therebetween, and means to adjust the angular position of the plane of rotation of said gear regardless of whether or not said gear is being driven by said pinion, whereby the length of the stroke of reciprocation of said carriage may be adjusted in accordance with the angular relationship between the plane of rotation of said gear and the line of reciprocatory movement of said carriage.

JOSEPH B. ARMITAGE.
JAMES N. FLANNERY.

REFERENCES CITED

The following references are of record in the file of this patent:

UNITED STATES PATENTS

| Number | Name | Date |
| --- | --- | --- |
| 1,007,127 | Marsh | Oct. 31, 1911 |
| 1,367,680 | Allen | Feb. 8, 1921 |
| 2,263,635 | Larsen | Nov. 25, 1941 |

FOREIGN PATENTS

| Number | Country | Date |
| --- | --- | --- |
| 431,635 | Great Britain | July 11, 1935 |
| 588,397 | France | Jan. 30, 1925 |